US009735960B2

(12) United States Patent
Hagiwara et al.

(10) Patent No.: US 9,735,960 B2
(45) Date of Patent: Aug. 15, 2017

(54) METHOD FOR PROTECTING DATA STORED WITHIN A DISK DRIVE OF A PORTABLE COMPUTER

(71) Applicant: LENOVO (SINGAPORE) PTE. LTD., Singapore (SG)

(72) Inventors: Mikio Hagiwara, Tokyo (JP); Eitaroh Kasamatsu, Kawasaki (JP)

(73) Assignee: LENOVO (SINGAPORE) PTD LTE, Singapore (SG)

( * ) Notice: Subject to any disclaimer, the term of this patent is extended or adjusted under 35 U.S.C. 154(b) by 0 days.

(21) Appl. No.: 14/797,947

(22) Filed: Jul. 13, 2015

(65) Prior Publication Data
US 2016/0026810 A1    Jan. 28, 2016

(30) Foreign Application Priority Data

Jul. 24, 2014   (JP) .................................. 2014-150643

(51) Int. Cl.
*H04L 9/08*     (2006.01)
*H04L 9/32*     (2006.01)
(Continued)

(52) U.S. Cl.
CPC .............. *H04L 9/0877* (2013.01); *G06F 3/06* (2013.01); *G06F 21/575* (2013.01); *G06F 21/78* (2013.01);
(Continued)

(58) Field of Classification Search
CPC .................................................. G06F 12/14
See application file for complete search history.

(56) References Cited

U.S. PATENT DOCUMENTS 7,343,493 B2 * 3/2008 Challener ............... G06F 21/57
    713/193
7,421,588 B2 * 9/2008 Challener ............. G06F 21/575
    713/193
(Continued)

FOREIGN PATENT DOCUMENTS

JP    2001-016655    1/2001
JP    2006-323814    11/2006
(Continued)

OTHER PUBLICATIONS

Microsoft, BitLocket Drive Encryption Overview, Jul. 8, 2016.
(Continued)

*Primary Examiner* — Kambiz Zand
*Assistant Examiner* — Thanh Le
(74) *Attorney, Agent, or Firm* — Russell Ng PLLC; Antony P. Ng

(57) ABSTRACT

A portable computer capable of protecting an encryption key that is sent out to a disk drive after a preboot process has ended is disclosed. The portable computer includes a disk drive for encrypting a volume as a whole, and for decoding data at the volume in response to a receipt of an encryption key from a system. The portable computer also includes a key transfer mechanism, a tamper detection mechanism and a protecting mechanism. In response to a boot process starting from a power-off state, the key transfer mechanism automatically sends the encryption key to the disk drive. The tamper detection mechanism detects a physical tampering of the disk drive. In response to a detection of a physical tampering by the tamper detection mechanism, the protecting mechanism prevents an operation of automatically sending the encryption key to the disk drive by the key transfer mechanism.

15 Claims, 4 Drawing Sheets

(51) Int. Cl.
 *G06F 3/06* (2006.01)
 *G06F 21/57* (2013.01)
 *G06F 21/78* (2013.01)
 *G06F 21/86* (2013.01)

(52) U.S. Cl.
 CPC ............ G06F 21/86 (2013.01); H04L 9/3239 (2013.01); *G06F 2221/2107* (2013.01)

(56) References Cited

U.S. PATENT DOCUMENTS

| | | | | |
|---|---|---|---|---|
| 7,613,934 B2* | 11/2009 | Hou | ...................... | G06F 1/3203 |
| | | | | 713/300 |
| 8,782,432 B2* | 7/2014 | Oshida | ................... | G06F 21/73 |
| | | | | 713/189 |
| 2008/0076355 A1 | 3/2008 | Waltermann et al. | | |
| 2008/0148388 A1* | 6/2008 | Wooten | ................... | G06F 21/34 |
| | | | | 726/17 |
| 2010/0082960 A1* | 4/2010 | Grobman | .............. | G06F 21/575 |
| | | | | 713/2 |
| 2012/0275596 A1 | 11/2012 | Ureche et al. | | |
| 2012/0278579 A1* | 11/2012 | Goss | ................... | G06F 12/0246 |
| | | | | 711/166 |

FOREIGN PATENT DOCUMENTS

| | | |
|---|---|---|
| JP | 2013-145475 | 7/2013 |
| JP | 2014-057283 | 3/2014 |
| WO | 2010-113266 | 10/2010 |
| WO | 2012-060683 A1 | 5/2012 |

OTHER PUBLICATIONS

Microsoft, BitLocket Drive Encryption in Windows Vista, pp. 1-6, updated Aug. 8, 2010 URL: https://technet.microsoft.com/en-us/library/2d130e11-a796-43b7-98ed-d389cad285f5.

* cited by examiner

METHOD FOR PROTECTING DATA STORED WITHIN A DISK DRIVE OF A PORTABLE COMPUTER

PRIORITY CLAIM

The present application claims benefit of priority under 35 U.S.C. §§120, 365 to the previously filed Japanese Patent Application No. JP2014-150643 with a priority date of Jul. 24, 2014, winch is incorporated by reference herein.

BACKGROUND OF THE INVENTION

1. Technical Field

The present invention relates to data protection in general, and particularly to a method for protecting an encryption key sent by a system to a disk drive within the system for reading encrypted data.

2. Description of Related Art

The field for information processing has always been struggling with the difficulty of protecting data stored in a hard disk drive (HDD) and/or a solid state drive (SSD) located within a computer. Microsoft Cooperation had provided a product called Windows® BitLocker® drive encryption that encrypts the entire volume of a disk drive as a whole.

Windows® BitLocker® is configured to write data encrypted by a processor of a computer system to a HDD of the computer system. Hereinafter, Windows® BitLocker® will be called software BitLocker®. Although a software BitLocker can eliminate the risk of data being eavesdropped through stolen HDDs or recycled computers, it takes many hours to perform an initial encryption, and the system performance will be degraded because of the encryption processing and decoding processing that are required for every data access.

In order to improve security techniques in computing environment, the Trusted Computing Group (TCG) released in 2012 the TCG Storage Security Subsystem Class: Opal "Specification Version 2.00" (TCG OPAL) as a specification for storage security. Since then, many vendors have provided hardware-based full disk encryption (FDE) disk drives complying with the TCG OPAL. FDE disk drives are configured to encrypt all data in a disk or a disk volume by an encrypting technique using hardware and device firmware mounted internally. The encryption is performed using a 128-bit or 256-bit Advanced Encryption Standard (AES) key.

Microsoft Corporation developed the specification of new BitLocker® incorporated into an operating system, which uses a HDD called eDrive complying with TCG OPAL and IEEE 1667, and started the implementation thereof in Windows® 8 operating system. Hereinafter such BitLocker® that performs encryption inside of a HDD will be called hardware BitLocker®. In hardware BitLocker®, the eDrive internally encrypts all data received from a computer system.

While the hardware BitLocker® has the advantage of having an excellent performance compared with the software BitLocker®, it has another problem of an encryption key being eavesdropped. The eDrive of the hardware BitLocker® encrypts data received from the system using a full volume encryption key (FVEK). This FVEK is encrypted by a volume master key (VMK) that the system has. The VMK is protected by a security chip called Trusted Platform Module (TPM) having the specification specified by the TCG, and so it is at a very low risk of being eavesdropped when the system holds the key.

In the hardware BitLocker®, in order to allow the eDrive to read encrypted data stored, the VMK has to be transferred to the eDrive to decode the FVEK. When the eDrive is a boot drive, the hardware BitLocker® has to transfer the VMK to the eDrive for decoding before loading of a boot file starts. The hardware BitLocker® set to enable transfers the VMK to the eDrive automatically during the boot routine. At this point, if an eavesdropper who has acquired the computer in an unauthorized manner inserts an eavesdropping device between the eDrive and a connector of a motherboard and starts the booting process, then the VMK that is automatically transferred by the system can be intercepted. Such a problem does not happen in the software BitLocker® because there is no need to transfer an encrypted key to the HDD.

There is a prior art method for preventing eavesdropping of a HDD password. When system firmware, such as BIOS and UEFI, returns from a suspend state or a hibernation state, if detachment of the disk drive from the main unit before that is detected, the software stops automatic transmission of a HDD password, and requests a user to input the password or forcibly shuts down the system to protect the password.

The above-mentioned prior art method for protecting a HDD password that a system firmware sends out cannot stop the automatic transmission of the VMK by the hardware BitLocker® even if insertion of an eavesdropping device can be detected. The hardware BitLocker® enables setting so as to request user authentication every time the FMK is sent. That is, eavesdropping can be prevented by setting user authentication by a password that the authentic owner of the computer only knows as the condition to transfer the VMK. Since the VMK is protected via the TPM, the eDrive detached and attached to another computer will fail to acquire the VMK with such a computer.

Requesting of a password every time the system boots or resumes from a sleep state, however, will unfavorably impair the quick returning of the computer. Further, password management will be burden for a user, and so the user may not set a password. In this case, protection using a password is practically difficult. Since the advantage of the hardware BitLocker® resides in automatic and transparent encryption of the volume as a whole, the VMK also has to be protected so as not to impair such an advantage. If the VMK can be protected by system firmware only that runs in secure environment of the computer, the protection will be reliable and the implementation can be facilitated, meaning that a protective function can be easily implemented in the computer.

Consequently, it would be desirable to provide an improved method for protecting an encryption key that is sent by a system to a disk drive within the system for reading encrypted data.

SUMMARY OF THE INVENTION

In accordance with a preferred embodiment of the present invention, a portable computer includes a disk drive that encrypts a volume as a whole, and decodes data at the volume when receiving an encryption key from a system. The portable computer includes a key transfer mechanism that automatically sends the encryption key to the disk drive when boot starts from a power-off state; a tamper detection mechanism that detects physical tampering to the disk drive; and a protecting mechanism that prevents operation by the key transfer mechanism to automatically send the encryption key to the disk drive in response to detection by the tamper detection mechanism of a physical tampering.

When no physical tampering is detected, the key transfer mechanism automatically sends the encryption key for decoding of data, so as to end the boot. On the other hand, when physical tampering is detected, automatic transferring of the encryption key is prevented, whereby risk of eavesdropping of the encryption key by an eavesdropping device inserted can be reduced. The protecting mechanism may include a TPM that seals the encryption key using a Platform Configuration Register (PCR), and the key transfer mechanism may make an unseal request of the encryption key to the TPM before transferring the encryption key.

After a system firmware has written a hash value at a PCR used for sealing of the encryption key during preboot, the protecting mechanism may write a dummy hash value at the PCR. As a result, the TPM does not unseal the encryption key in response to an unseal request, if any, whereby the operation to send the encryption key can be prevented. When a PCR used for sealing includes a PCR specific to a platform of the portable computer, the protecting mechanism can write the dummy hash value at the specific PCR only.

This enables unseal of the encryption key to be stopped by writing of a dummy hash value at the specific PCR when physical tampering is detected and by writing of a hash value at another PCR by malware or by contaminated system firmware when the system is contaminated by the malware. When a dummy hash value is written at the specific PCR, boot may be continued without restarting using a recovery password, and another program can use the PCR where the system firmware writes a hash value during preboot.

In response to detection of the physical tampering to the disk drive, the protecting mechanism requests an input of a password. Such a password may be any one of a power-on password, a HDD password or a supervisor password. The tamper detection mechanism may also detect a detachment of a lid of a chassis to remove the disk drive from the portable computer.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Configuration of a Portable Computer

Figure 1:
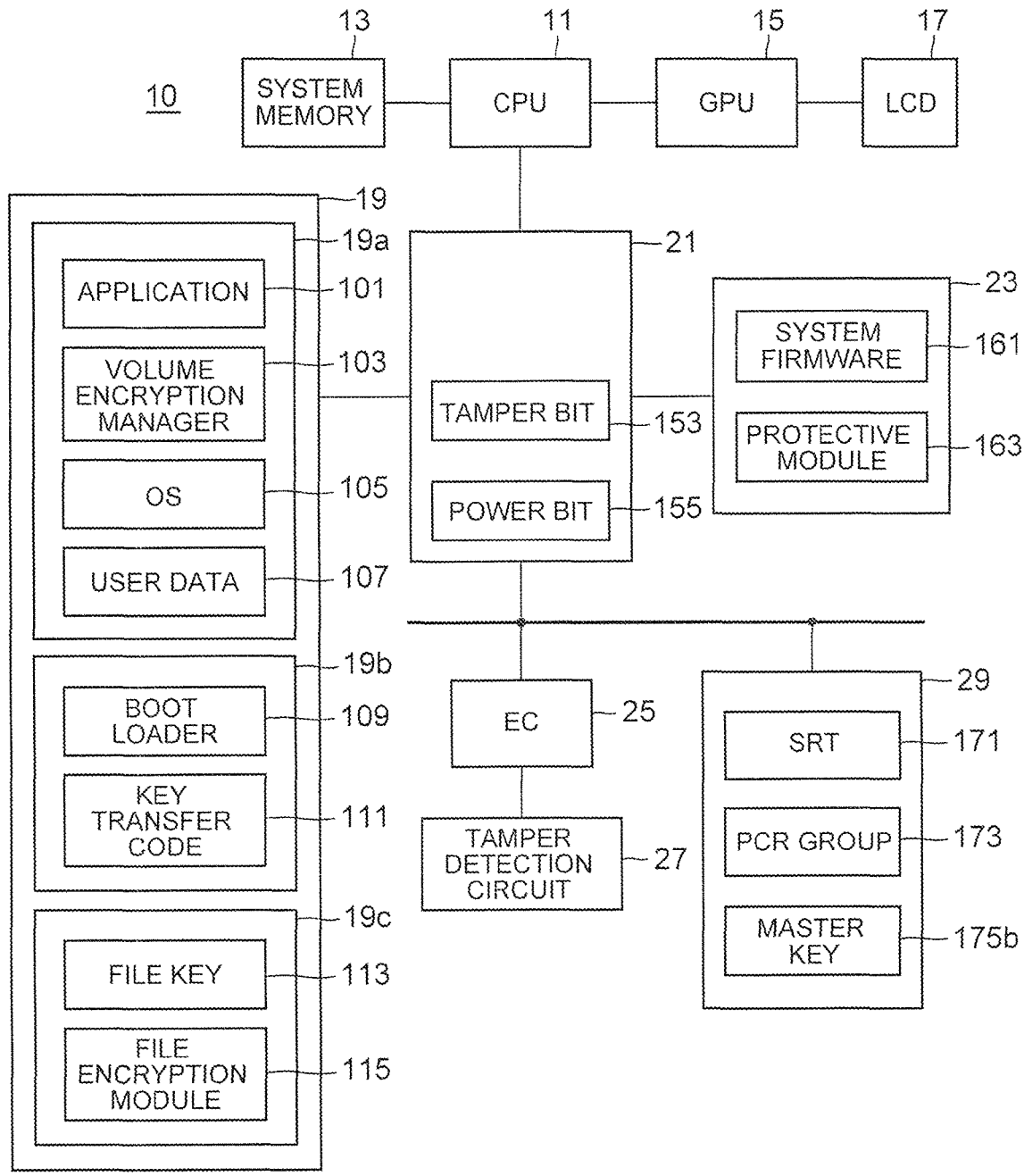
FIG. 1 is a block diagram of a portable computer, in accordance with a preferred embodiment of the present invention.

FIG. 1 is a block diagram of a laptop personal computer (laptop PC) 10. Although the present invention is not limited in scope to the laptop PC 10, the application of the present invention to the laptop PC 10 has significance because a master key to be protected is stored in a computer including, a disk drive 19 attached thereto, and, the laptop PC 10 is often stolen in the state of including the disk drive 19 attached thereto. Since the configuration of the hardware of the laptop PC 10 is well-known, the following describes it within a range required for understanding of the present invention.

A platform controller hub (PCH) 21 is connected to a CPU 11, the disk drive 19 such as a HDD or a SSD, a firmware ROM 23, an embedded controller (EC) 25 and a TPM 29. The CPU 11 is connected to a system memory 13, and a GPU 15, and the GPU 15 is connected to a LCD 17.

A PCH 21 includes various interface controllers, such as PCI Express, Serial ATA, USB, and LAN as well as a non-volatile memory to store a tamper bit 153 and a volatile memory to store a power bit 155. These non-volatile memory and volatile memory are protected so that a protective module 163 only can access the tamper bit 153 and the power bit 155. Specifically, they can be protected by, prior to passing the access right for the CPU 11 from a system firmware 161 and the protective module 163 to an OS 105, locking memory controllers of them. Such lock is unlocked when the PCH 21 is reset and the system firmware 161 starts booting.

In the present specification, a sealed master key is denoted with reference numeral 175$b$, and an unsealed plaintext-master key is denoted with reference numeral 175$a$. The tamper bit 153 and the power bit 155 are referred to by the protective module 163.

The disk drive 19 includes a volume 19$a$ to store data to be encrypted and a volume 19$b$ to store data not to be encrypted, both of which the system can access, and a system region 19$c$ to store data that a firmware only of the disk drive 19 can access. The volumes 19$a$ and 19$b$ are logical storage regions each including one or more partitions. All data stored in the volume 19$a$ is encrypted by a file encryption module 115 that the disk drive 19 executes using a file key 113.

The disk drive 19 is a boot drive to store a boot image, and the volume 19$a$ stores boot files such as an application program 101, a volume encryption manager 103, and the OS 105, and user data 107. The volume encryption manager 103 provides a user interface to allow a user to set a FDE function to enable or disable. In one example, the volume encryption manager 103 is an application program incorporated into the OS 105. When the FDE function is set to enable, the volume encryption manager 103 creates a master key 175$a$ and sends the same to the disk drive 19.

The volume 19$b$ stores a boot loader 109, a key transfer code 111 and the like. The boot loader 109 is stored in a boot sector or a MBR of the disk drive 19. When the OS 105 is installed in the UEFI mode, the boot loader 109 is stored as any file at any place of the volume 19$b$. The key transfer code 111 is executed by the CPU 11 as a part of the volume encryption manager 103, thus configuring a key transfer mechanism. The key transfer code 111 has to unseal a master key 175$b$ sealed by the TPM 29 and transfer the same to the disk drive 19 before starting of the load of the OS 105 encrypted at the time of booting, and so the key transfer code is stored in the volume 19$b$ that is not encrypted. When the protective module 163 detects a physical tampering based on the tamper bit and the power bit, the key transfer code 111 displays a prompt to input a recovery password on the LCD 17.

The system region 19e stores the file key 113 and the file encryption module 115. The file encryption module 115 is a part of a firmware that is executed by a CPU built in the disk drive 19. Even when the FDE function is set to any one of enable and disable, the file encryption module 115 encrypts data received from the system with the file key 113 and stores the same in the volume 19a. When the volume encryption manager 103 sets the FDE function to enable, the file encryption module 115 decodes data corresponding to a reading request only when it receives a plaintext-master key 175a from the system.

When the volume encryption manager 103 sets the FDE function to disable, the file encryption module 115 decodes data even when it does not receive a plaintext-master key 175a from the system. In any case, although the decoded data is returned in response to a request from the system, when the FIDE function is set to enable, the system cannot read data of the volume 19a unless the master key 175a is sent to the disk drive 19. Once the FDE function is set, such setting is effective for booting next time or later until it is set to disable again. Even when receiving the master key 175a once, and then if the power supply stops or when receiving a reset command from the system, the file encryption module 115 does not decode data of the volume 19a before it receives the master key 175a again.

In one example, the volume encryption manager 103 and the key transfer code 111 may be hardware BitLocker® incorporated into Windows® 8. In that case, the disk drive 19 can make up an eDrive configuring a part of the hardware BitLocker® when the file encryption module 115 is implemented. Herein, the applicable range of the present invention is not limited to the hardware BitLocker®, and is applicable to another encryption system as well, in which an OS, i.e., a program executed after loading of a boot loader sends an encryption key to a FDE disk drive.

The firmware ROM 23 stores the system firmware 161 such as BIOS or UEFI firmware, and the protective module 163 configuring a part thereof. The system firmware 161 has its most important part that is specified as Core Root of trust for Measurement (CRTM) that is specified in the specification of the Trusted Platform Module (TPM). The CRTM is configured so as not to be rewritten in the system firmware 161 without special authority, and is always executed firstly when the laptop PC 10 is booted.

The CRTM inspects and initializes the CPU 11, a main memory 11 and other basic devices required for the processing from loading of the system firmware 161 to the system memory 13 and to starting the execution. The system firmware 161 includes a code for inspection and initialization (POST) of other devices, a code to authenticate a power-on password or a password set at a disk drive, and a code to allow a user to set a system configuration, for example.

Figure 2:
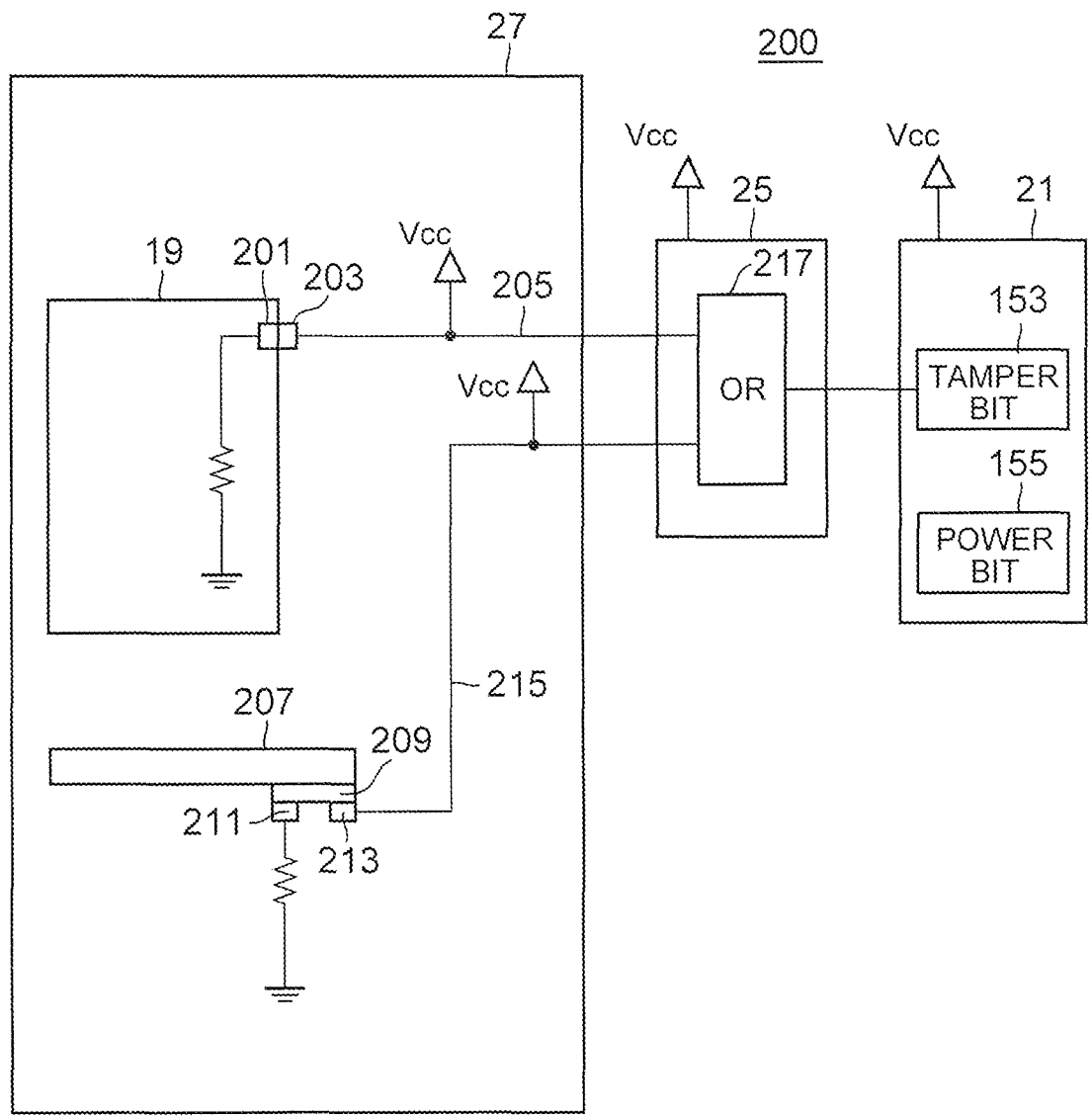
FIG. 2 is a block diagram of a tamper detection mechanism, in accordance with a preferred embodiment of the present invention.

The protective module 163, when being executed by the CPU 11, makes up a protecting mechanism in cooperation with the TPM 29 so as to prevent automatic transferring of the master key 175a using a key transfer code 111 if physical tampering to the disk drive 19 is detected. At the time of boot from S4 state (hibernation state) or S5 state (soft off state) (hereinafter called cold boot), and before the load of the OS 105 starts, the protective module 163 inspects the tamper bit 153 and the power bit 155. Then if any physical tampering is detected, the protective module 163 writes a dummy hash value at a Platform Configuration Register (PCR) of a predetermined number that is designated to seal the master key 175a using Extend command. When the system transitions to S4 state or S5 state, the protective module 163 resets a tamper detection mechanism 200 (FIG. 2).

The EC 25 is a microcomputer including a CPU, a ROM, a RAM and the like, and manages the temperature of a chassis and the power supply of the laptop PC 10. The EC 25 is connected to a tamper detection circuit 27. The tamper detection circuit 27 detects, as physical tampering, a phenomenon that is expected to occur when an eavesdropping device is attached to the disk drive 19. Referring to FIG. 2, the configuration of the tamper detection circuit 27 is described later.

The TPM 29 includes a processor, a non-volatile memory and the like, which is a well-known semiconductor chip that internally performs encryption and decoding, creating of a key pair for RSA, verification of completeness of a platform, and the like. The TPM 29 includes a Storage Root Key (SRT) 171 that is used to seal the master key 175a generated by the volume encryption manager 103 when the FDE function is set to enable, a group of 24 pieces PCRs 173 in one example, and the sealed master key 175b.

B. Tamper Detection Mechanism

FIG. 2 is a block diagram of the tamper detection mechanism 200 including the tamper detection circuit 27, the EC 25, the tamper bit 153 and the power bit 155. The power supply for the EC 25, the tamper detection circuit 27 and a part of the PCH 21 including a volatile memory that stores the tamper bit 153 is kept during S4 state or S5 state as well. One of the inputs of an OR circuit 217 in the EC 25 is connected to a terminal 203 of a connector, to which the disk drive 19 is to be connected via a detection line 205.

The other input of the OR circuit 217 is connected to a terminal 213 via a detection line 215. The terminals 211 and 213 are left on the chassis side when a lid 207 is detached from the chassis. The detection lines 205, 215 are pulled up by power-supply voltage Vcc. The disk drive 19 is pulled down to the ground at a terminal 201 by a resistor. When the disk drive 19 is connected to the connector, the electric potential of the detection line 205 is at the ground level. When the disk drive 19 is removed from the connector, the electric potential of the detection line 205 rises to the power-supply voltage Vcc.

An electrode piece 209 is attached to the lid 207 of the chassis. The terminal 211 is pulled down to ground plane of the system by a resistor. When the lid 207 is attached to the chassis of the laptop PC 10, the terminals 211 and 213 are short-circuited, and so the electric potential of the detection line 215 is at the ground level. When the lid 207 is detached, the electric potential of the detection line 215 rises to the power-supply voltage Vcc. The OR circuit 217 sets the tamper bit 153 of the PCH 21 when any one of the electric potential at the detection lines 205 and 215 rises.

The operation by the tamper detection mechanism 200 is described as follows. During preboot, when consistency of the system is confirmed through the verification of a PCR value that the system firmware 161 writes at the PCR group 173 and its sequence, and when user authentication is successfully performed by a password, the protective module 163 sets the power bit 155. Herein, preboot refers to the boot routine of the entire procedure of the boot that is performed by the system firmware 161 prior to execution of the boot loader 109. Since the volatile memory keeps the stored contents unless the system transitions to the state (G3 state) where all power supplies are removed from the laptop PC 10, the power bit 155 once set is kept.

An eavesdropper opens the lid 207 to insert an eavesdropping device in the disk drive 19 housed in the chassis. Alternatively, an eavesdropping device can be inserted into the disk drive 19 that is attached at a bay of the chassis, after an eavesdropper has removed the disk drive from the connector. At this time, the tamper bit 153 is set when the power-supply voltage Vcc is present. The tamper bit 153 once set will not be reset unless a recovery password described later is input.

If the lid 207 is opened in G3 state of the system, the OR circuit 217 does not function, and so the tamper bit 153 is not set, but the power bit 155 is reset. The power bit once reset will not be set unless a recovery password is input or a password requested from the protective module 163 is input. When the protective module 163 detects any one of the set of the tamper bit 153 and the reset of the power bit 155, the protective module determines it as physical tampering. When both of the reset of the tamper bit 153 and the set of the power bit 155 are detected at the same time, the protective module 163 determines it as no physical tampering.

C. Sealing of a Master Key by PCR

Figure 3:
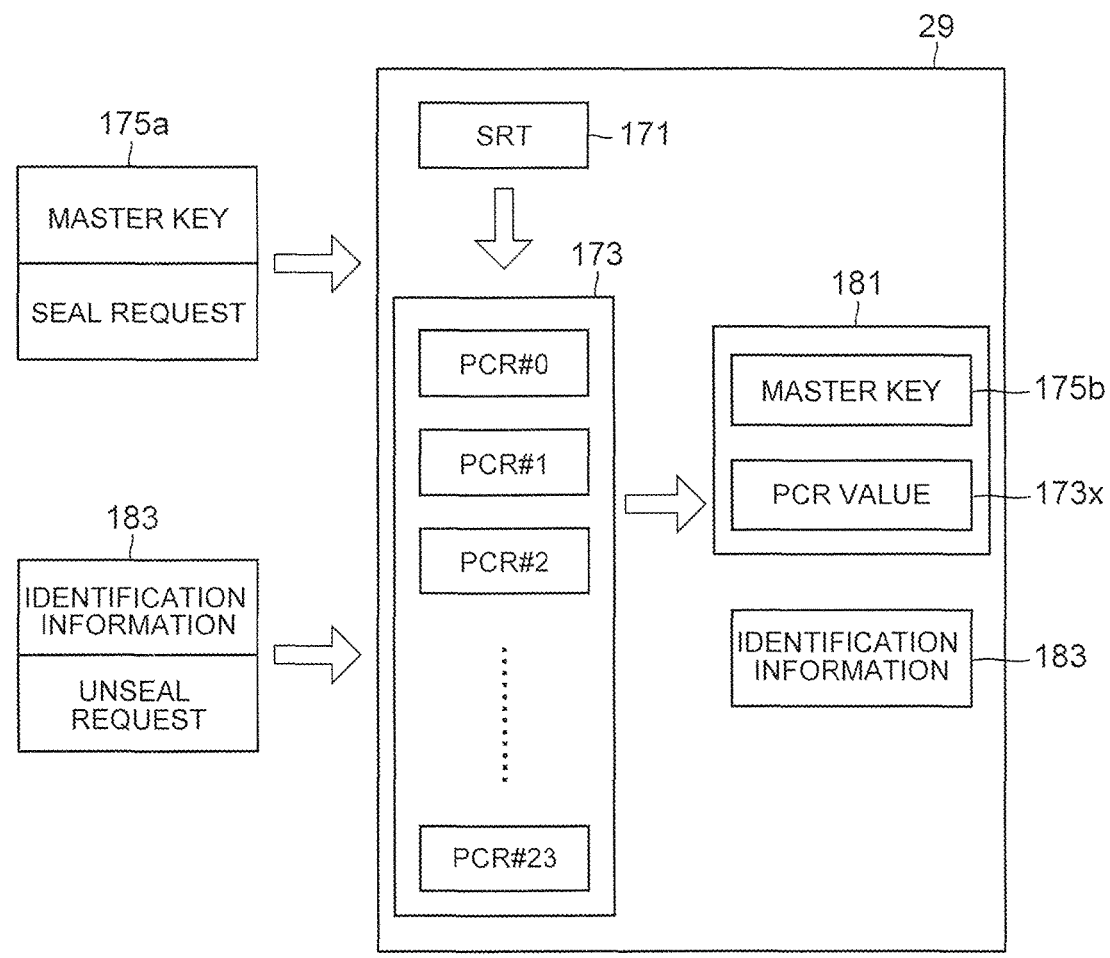
FIG. 3 describes how to seal and unseal a master key.

FIG. 3 describes the state where the TPM 29 seats the master key 175a. When the power supply of the laptop PC 10 is activated to start cold boot, the system firmware 161 is firstly executed. After preboot by the system firmware 161 ends, boot ends when a boot image stored in the volume 19a is loaded.

The system uses the CRTM as the root of trust of firmware to calculate device information and a hash value of a module to be executed subsequently and record them at a PCR of a predetermined number. PCR usage is defined by the TCG. For instance, hash values of CRTM, BIOS code and host platform extensions are written at PCR#0. Hash values of hardware platform configuration are written at PCR#1. Hash values of option ROM code are written at PCR#2. Hash values of option ROM configuration and data are written at PCR#3. Hash values of the boot loader 109 of MBR are written at PCR#4. The system firmware 161 is allowed to write at PCR#0 to #7 and platform is allowed to write hash values specific thereto at PCRs#8 to #23.

A program to write at the PCR group 173 has to always issue an Extend command and send a hash value calculated to the TPM 29. When an Extend command is issued, the TPM 29 calculates as in a new PCR value=HASH (old PCR value+calculated hash value), and records the new PCR value at a PCR of a designated number. The old PCR value is a PCR value that the PCR group 173 stores when receiving the Extend command. When the power supply of the TPM 29 stops and the PCR is reset, a predetermined PCR value is stored in the PCR group 173. The PCR group 173 is a volatile memory, and so the PCR value once written cannot be deleted until the power supply of the TPM 29 stops.

The power supply of the TPM 29 stops when the laptop PC 10 transitions to S4 state or S5 state. The TPM 29 stores a PCR value stored when boot is performed in a safe state and its sequence. Since the TPM 29 stores the result of calculation based on the above expression at the PCR group 173, it is difficult for malware to rewrite a PCR value with the old PCR value. In this way, the system firmware 161 and the OS 105 can verify the consistency of software using a PCR value and by a well-known method.

Next the following describes seal of the master key 175a generated by the volume encryption manager 103. Seal refers to encryption by the TPM 29 of a target key together with a PCR value stored at the designated PCR. The volume encryption manager 103 designates the number of a PCR to be used for sealing and sends the created master key 175a to the TPM 29 for seal request.

Receiving a seal request, the TPM 29 creates a key for seal from the SRT 171 and encrypts the master key 175a and a PCR value 173x stored at that time at the PCR designated to create an encrypted object 181, and then associates this with identification information 183 and stores the resultant at a non-volatile memory inside of the TPM 29. The encrypted master key 175b included in the encrypted object 181 is not decoded unless the TPM 29 receiving an unseal request verifies the identity in PCR value, and so it can be stored outside of the TPM 29.

In order to load a boot image stored at the volume 19a during boot, it is required for the key transfer code 111 to acquire a decoded master key 175a and send it to the disk drive 19. In the present embodiment, if the tamper detection mechanism 200 detects physical tampering, a dummy hash value is written at a PCR designated for sealing of the master key 175a, thereby preventing the TPM 29 from unsealing the master key 175b. To this end, the PCR designated for seal of the master key 175a can be any one or a plurality of PCR#0 to PCR#4 where calculated hash values are written during preboot.

Next, the following describes unseal of the sealed master key 175b. Herein unseal refers to decoding by the TPM 29 of a target key if the PCR value at the time of seal of the target key is not altered at that time. The key transfer code 111 sends identification information 183 to the TPM 29 for unseal request. Receiving the unseal request, the TPM 29 creates a key used for unseal from the SRT 171 and decodes the encrypted object 181.

After the receipt of an unseal request, the TPM 29 compares the PCR value stored at the PCR designated during sealing and the decoded PCR value 173x. Only when they agree, the TPM 29 passes the decoded master key 175a to the key transfer code 111. When they do not agree, this means that platform is changed in state between sealing and unsealing due to malware or unauthorized action on hardware, and so the TPM 29 does not output the master key 175a.

D. Method for Protecting a Master Key

Figure 4:
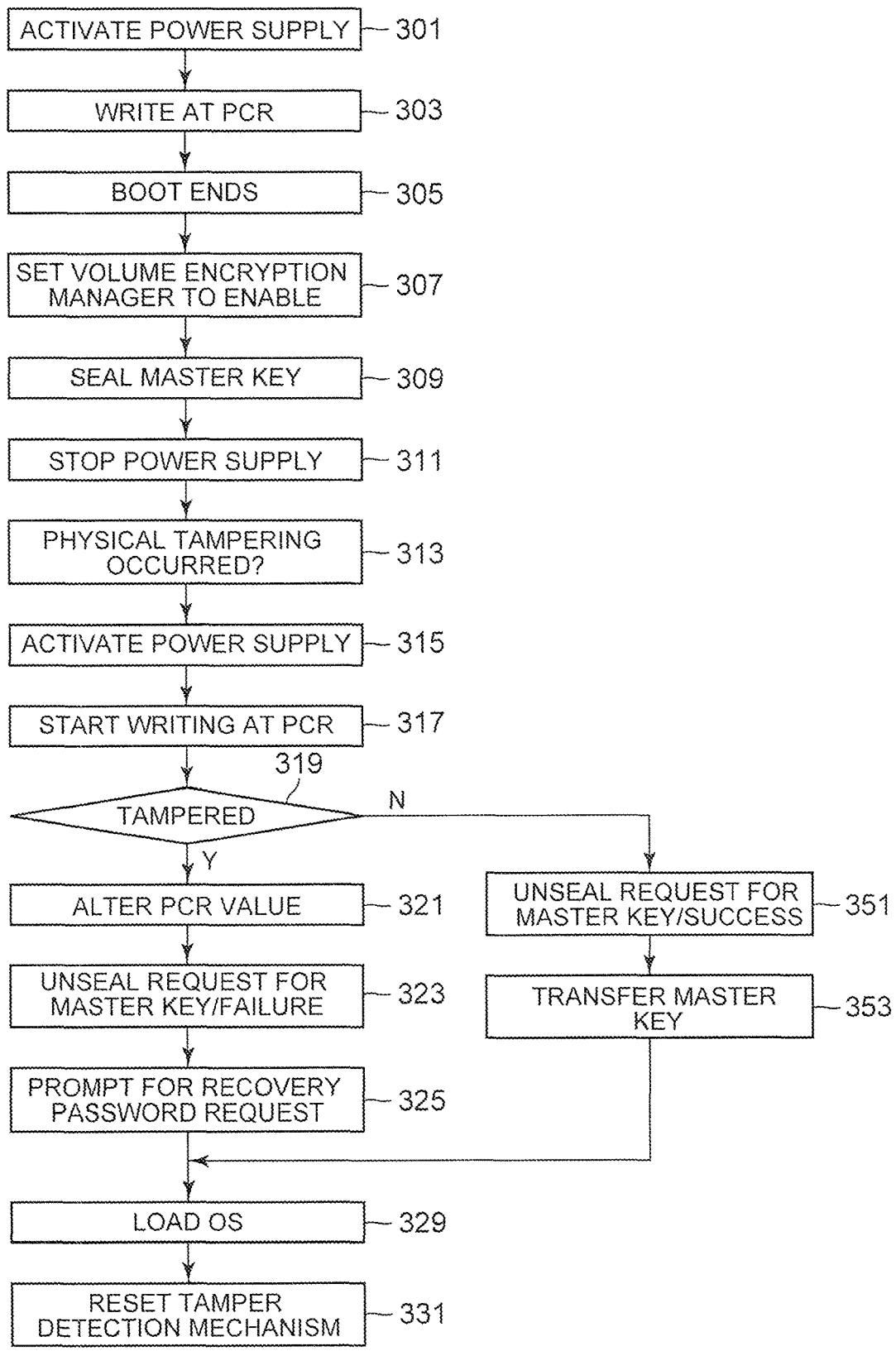
FIG. 4 is a flowchart of a method for protecting a master key, in accordance with a preferred embodiment of the present invention.

Referring next to FIG. 4, there is depicted a flowchart of a method for preventing eavesdropping of the master key 175a, in accordance with a preferred embodiment of the present invention. At block 301, the power supply of the laptop PC 10 is activated to start cold boot. Assuming that the FDE function of the volume encryption manager 103 is set to disable and the master key 175a is not created, that the tamper bit 153 is reset, and that the power bit 155 is reset after the laptop PC 10 transitions to G3 state immediately before the cold boot. At block 303, the system firmware 161 writes calculated hash values at the PCR group 173 one by one, and then the TPM 29 stores, at a predetermined PCR, a new PCR value that is calculated including an old PCR value.

The system firmware 161 writes hash values from PCR#0 to PCR#4, and the TPM 29 confirms the safety of platform that can be verified at that time, and then the protective module 163 is executed. The consistency of the protective module 163 also can be verified before the execution using any one of PCRs#5 to #7, for example. Since the hash value of the boot loader 109 is written at PCR#4, it can be considered that successfully performed boot routine until then means the safety of the system firmware 161 as well as the protective module 163, and so the following procedure can be executed in an environment with secured security.

The protective module 163 confirms the reset of the power bit 155, and then displays a prompt for user authentication. When the user authentication by inputting a password succeeds, the protective module 163 sets a power bit 155. The password may be one that the system firmware 161 uses for authentication, such as a power-on password or a supervisor password. Then, an eavesdropper who does not know the password authenticated by the system firmware 161 cannot set the power bit 155 after transitioning to G3 state, and so the possibility of physical tampering can be detected if the power bit 155 is reset.

Since the FDE function of the volume encryption manager 103 is set to disable, the disk drive 19 decodes read data at the volume 19a and passes it to the system, without receiving the master key 175a. Written data is encrypted with the file key 113, and then is written at the volume 19a. At block 305, the entire boot image including the OS 105 is loaded to end the boot.

At block 307, the user activates the volume encryption manager 103 and sets the FDE function to enable. The volume encryption manager 103 set to enable creates the master key 175a, and sends it to the disk drive 19. Then the disk drive 19 recognizes the FDE function set to enable, and does not decode data at the volume 19a unless it receives the master key 175a after resetting.

At block 309, the volume encryption manager 103 sends the master key 175a to the TPM 29 for seal request. At this time, the volume encryption manager 103 can designate five PCRs from PCRs#0 to #4 in one example. The TPM 29 encrypts the master key 175a and the PCR values of designated PCRs#0 to #4 to create an encrypted object 181 and store it internally. Herein, it can be assumed that the owner of the laptop PC 10 sets the FDE function of the volume encryption manager 103 to enable, and so the PCR values stored at PCRs#0 to #4 at this time can be assumed as values to ensure the safety.

At block 311, the power supply stops, and at block 313, the disk drive 19 or the lid 207 may be removed and tampering may occur. As a result, the tamper detection circuit 27 sets a tamper bit 153, or the power bit 155 is reset due to transition to G3 state. At block 315, the power supply is activated, and at block 317, the system firmware 161 stores PCR values at PCRs#0 to #4. Unless the system suffers from physical tampering and invasion by malware as a target of the present embodiment, the system firmware 161 writes the PCR values at PCRs#0 to #4 by predetermined sequence.

After the system firmware 161 writes hash values from PCRs#0 to #4, the protective module 163 is executed. In the absence of physical tampering and contamination by malware, the same values as those of the PCR values stored at block 303 are stored at PCRs#0 to #4. At block 319, the protective module 163 refers to the tamper bit 153 and the power bit 155. If the protective module 163 detects any one of the set of the tamper bit 153 and the reset of the power bit 155, it is considered as physical tampering occurred, and the procedure shifts to block 321. If the protective module 163 detects both of the states of the reset of the tamper bit 153 and the set of the power bit 155, it is considered as no physical tampering, and the procedure shifts to block 351.

At block 321, the protective module 163 writes a dummy hash value at any one of or all of the PCRs#0 to #4 designated at block 309 for sealing of the master key 175a by an Extend command. After preboot, the boot loader 109 stored at the volume 19b is loaded, and then the key transfer code 111 is loaded. At block 323, the key transfer code 111 sends identification information on the volume encryption manager 103 to the TPM 29 to request unseal of the sealed master key 175b.

Since the key transfer code 111 does not recognize the altering of PCR value at block 321, it executes the unseal request as the usual procedure. Although the TPM 29 processes the unseal request, since the PCR value 173x at PCRs#0 to #4 used for sealing at block 309 and the PCR values stored at PCR#0 to #4 at the time of unseal request are different, and so the master key 175b is not unsealed. Then, since the key transfer code 111 cannot transfer the master key 175a to the disk drive 19, eavesdropping can be prevented. If the master key 175a cannot be transferred to the disk drive 19, data at the volume 19a cannot be loaded, and so boot stops.

Recognizing the failure of unseal of the master key 175b, the key transfer code 111 displays a prompt for inputting of a recovery password on the LCD 17 at block 325. The recovery password is a credential that the owner of the laptop PC 10 who sets the FDE function to enable only knows. The key transfer code 111 transfers the master key 175a restored by the recovery password to the disk drive 19. Subsequently the disk drive 19 decodes read data at the volume 19a with the file key 113 and returns it to the system.

Since writing of hash values at PCRs#0 to #4 ends and the consistency is verified, boot proceeds even when the PCR values at PCRs#0 to #4 are altered at this time. At block 331, when the system shifts to S4 state or S5 state, the protective module 163 executes reset of the tamper bit 153 and set of the power bit 155 or any one of them as needed, so as to make the tamper detection mechanism 200 free from physical tampering. Herein successful cold boot means no tampering or inputting of a recovery password, following tampering performed. As a result, the protective module 163 shifts from block 319 to block 351 at the next cold boot without altering the PCR values at PCRs#0 to #4. At block 329, the boot image stored at the volume 19a is loaded one by one, and the boot ends.

At block 351, the key transfer code 111 loaded following the boot loader 109 executes usual procedure, and sends identification information on the volume encryption manager 103 to the TPM 29 for unseal request of the master key 175b. The TPM 29 processes the unseal request, and since the PCR value 173x at PCRs#0 to #4 used for sealing at block 309 and the PCR values stored at PCR#0 to #4 at the time of unseal request agree, the master key 175b is unsealed, and is returned to the key transfer code 111. At block 353, the key transfer code 111 transfers the master key 175a to the disk drive 19. Subsequently the disk drive 19 decodes read data at the volume 19a with the file key 113 until it is reset and returns it to the system.

The above example describes the case where a PCR designated for sealing of the master key 175a is selected from PCRs#0 to #4. These PCRs may be used for sealing of an encryption key that another program uses by itself. To this end, at block 331, the tamper detection mechanism 200 is reset, followed by restarting, whereby the procedure shifts from block 319 to block 351, where PCR values enabling unseal and not altered are written at PCRs#0 to #4, and so an encrypted key for another program can be unsealed.

After inputting a recovery password, however, it is convenient to shift to block 329 without restarting to end the boot. To this end, in addition to PCRs#0 to #4 used for sealing of the master key 175a, a PCR to store a hash value specific to platform also can be added. Such a specific PCR can be selected from PCRs#8 to #23, for example.

In this case, if the protective module 163 detects physical tampering, the protective module writes a dummy hash value at the specific PCR only by an Extend command. The protective module 163 writes different dummy hash values between the case where physical tampering is detected and the case where it is not detected. The TPM 29 can be configured so as not to unseal when the PCR value of the specific PCR does not agree between sealing and unsealing. Then, since the PCR values at PCRs#0 to #4 agree, this does not hinder the use by another program. When PCRs#0 to #4 are altered by malware as well, the TPM 29 does not unseal the master key 175*b*.

Since the thus described method protects the master key 175*a* with the tamper detection mechanism 200 and the protective module 163 only, there is no need to change the volume encryption manager 103 and the key transfer code 111, whereby the applicable range of the invention can be widened. Since the protective module 163 can run in the operating environment of the system firmware 161 that is disconnected from a network, the safety is high compared with the processing in the operating environment of the OS. Further, the laptop PC 10 implementing the TPM 29 can verify the consistency of the protective module 163 as well with the PCR group 173, and so the safety can be more improved.

In another method to protect the master key 175*a* with the tamper detection mechanism 200 and the protective module 163 only, if the tamper detection mechanism 200 detects physical tampering, the protective module 163 may stop preboot and request a password. The password may be one that the system firmware uses for authentication request, such as a power-on password, a HDD password or a supervisor password, as long as the protective module 163 as a part of the system firmware 161 can process it during preboot.

When password authentication succeeds, boot continues, and if password authentication does not succeed, boot stops at that time. The password can be stored in a secure non-volatile memory that the protective module 163 only can access. In this method, the safety of data stored at the volume 19*a* of the disk drive depends on the safety of a password that the system stores for authentication. However, the applicable range can be widened because it can be used in a computer not implementing the TPM 29 as well. In the case of the laptop PC 10 implementing the TPM 29, the protective module 163 can seal a password using the PCR group 173, whereby safety can be improved.

Next, the following describes a method for protecting data stored at the volume 19*a*, together with the tamper detection mechanism 200 and the protective module 163, by rewriting firmware of the disk drive 19 partially. If physical tampering is detected, the protective module 163 sends out tamper information to the disk drive 19. Receiving the tamper information, the file encryption module 115 of the disk drive 19 locks an access to the volume 19*a*. The file encryption module 115 does not decode the master key 175*a* even when receiving it from the key transfer code 111 as long as the volume 19*a* is locked.

The protective module 163 sends a recovery password that the user inputs to the disk drive 19. When authentication succeeds, the file encryption module 115 receiving the recovery password then unlocks the volume 19*a*, and then decodes the master key 175*a* when receiving it after that. In this method, eavesdropping occurs because the key transfer code 111 automatically transfers the master key 175*a* to the disk drive 19 after physical tampering. However, the master key 175*a* eavesdropped does not become effective before the recovery password is input. Since the owner of the laptop PC 10 only can input the recovery password, the data at the volume 19*a* can be protected.

As has been described, the present disclosure provides a method for protecting an encryption key that is sent by a system to a disk drive for reading encrypted data.

While the disclosure has been particularly shown and described with reference to a preferred embodiment, it will be understood by those skilled in the art that various changes in form and detail may be made therein without departing from the spirit and scope of the disclosure.

What is claimed is:

1. A portable computer comprising:
   a disk drive encrypts a volume as a whole, and decodes data at said volume in response to a receipt of an encryption key;
   a key transfer mechanism, in response to a boot process started from a power-off state, automatically sends said encryption key to said disk drive;
   a tamper detection mechanism detects an occurrence of a physical tampering to said disk drive; and
   a protecting mechanism, in response to a detection of an occurrence of a physical tampering to said disk drive, prevents said key transfer mechanism from automatically sending said encryption key to said disk drive.

2. The portable computer of claim 1, wherein said protecting mechanism includes a Trusted Platform Module (TPM) that seals said encryption key using a Platform Configuration Register (PCR).

3. The portable computer of claim 2, wherein said key transfer mechanism makes an unseal request of said encryption key to said TPM before transferring said encryption key.

4. The portable computer of claim 2, wherein after a system firmware has written a hash value at a PCR used for sealing of said encryption key during a preboot process, said protecting mechanism writes a dummy hash value at said PCR.

5. The portable computer of claim 4, wherein a PCR used for sealing said encryption key includes a PCR specific to a platform of said portable computer, and said protecting mechanism writes said dummy hash value at said specific PCR only.

6. The portable computer of claim 1, wherein said protecting mechanism, in response to said detection of said physical tampering of said disk drive, requests an input of a password.

7. The portable computer of claim 1, wherein said tamper detection mechanism detects said physical tampering of said disk drive by detecting a detachment of a lid of a chassis of a computer for the purpose of removing said disk drive from said computer.

8. The portable computer of claim 6, wherein said tamper detection mechanism sets a tamper bit in response to said detection of said physical tampering of said disk drive.

9. The portable computer of claim 8, wherein said tamper detection mechanism resets said tamper bit after said password has been provided.

10. A method comprising:
    starting a boot routine for a computer from a power-off state, wherein said computer includes a disk drive that encrypts a volume as a whole, and decodes data at said volume in response to a receipt of an encryption key to he sent to said disk drive in response to said boot routine started from said power-off state;
    detecting an occurrence of a physical tampering to said disk drive before said boot routine by a system firmware; and
    in response to a detection of an occurrence of a physical tampering to said disk drive, preventing said encryption key to be automatically sent to said disk drive after said boot routine has been completed.

11. The method of claim 10, wherein said preventing further includes sealing said encryption key via a Platform Configuration Register (PCR); and writing a dummy hash value at said PCR where said system firmware writes a hash value during said boot routine, in response to said detection of said occurrence of said physical tampering of said disk drive.

12. The method of claim 11, wherein said PCR in which said dummy hash value is written is different from a PCR where said system firmware writes a hash value during a normal boot routine.

13. The method of claim 10, wherein said preventing further includes requesting by said system firmware of a password input from a user, in response to said detection of said occurrence of said physical tampering to said disk drive.

14. A method, comprising:

starting a boot routine for a computer from a power-off state, wherein said computer includes a disk drive that encrypts a volume as a whole, and decodes data at said volume in response to a receipt of an encryption key to be sent to said disk drive in response to said boot routine started from said power-off state;

detecting an occurrence of a physical tampering;

in response to a detection of an occurrence of said physical tampering, transferring information of said physical tampering to a disk drive;

shifting said disk drive that had received said physical tampering information from an unlock state to a lock state; and stopping decoding data after said disk drive had shifted to said lock state even when an encryption key is received, until said disk drive has been shifted back to said unlock state.

15. The method of claim 14, further comprising:

sending a password to said disk drive, after said detection of said occurrence of said physical tampering; and shifting said disk drive back to said unlock state after the receipt of said password.

* * * * *